United States Patent
Ohhashi

(10) Patent No.: US 11,016,747 B2
(45) Date of Patent: May 25, 2021

(54) INFORMATION PROCESSING APPARATUS, METHOD, AND NON-TRANSITORY RECORDING MEDIUM STORING INSTRUCTIONS FOR EXECUTING AN INFORMATION PROCESSING METHOD

(71) Applicant: Hideki Ohhashi, Kanagawa (JP)

(72) Inventor: Hideki Ohhashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/299,268

(22) Filed: Mar. 12, 2019

(65) Prior Publication Data
US 2019/0303124 A1    Oct. 3, 2019

(30) Foreign Application Priority Data

Mar. 29, 2018   (JP) .............................. JP2018-066203

(51) Int. Cl.
*G06F 9/455*    (2018.01)
*G06F 9/448*    (2018.01)
(Continued)

(52) U.S. Cl.
CPC ................. *G06F 8/62* (2013.01); *G06F 8/30* (2013.01); *G06F 8/60* (2013.01); *G06F 8/61* (2013.01);
(Continued)

(58) Field of Classification Search
CPC ..... G06F 8/62; G06F 8/30; G06F 8/60; G06F 8/61; G06F 9/44521; G06F 9/546;
(Continued)

(56) References Cited

U.S. PATENT DOCUMENTS 8,136,100 B1 *    3/2012   Goldman ............ G06F 9/45558
                                              717/136
8,595,720 B2 *   11/2013   Kuroyanagi .............. G06F 8/61
                                              717/178
(Continued)

FOREIGN PATENT DOCUMENTS

JP    2014-170366 A    9/2014
JP    2015-041362      3/2015
(Continued)

OTHER PUBLICATIONS

Linh Manh Pham et al., An Adaptable Framework to Deploy Complex Applications onto Multi-cloud Platforms, 2015 IEEE, [ Retrieved on Dec. 21, 2020]. Retrieved from the internet: <URL: https://hal.archives-ouvertes.fr/hal-01232615/document> 7 Pages (1-7) (Year: 2015).*

(Continued)

*Primary Examiner* — Anibal Rivera
(74) *Attorney, Agent, or Firm* — Harness, Dickey & Pierce, P.L.C.

(57) ABSTRACT

An information processing apparatus, method, and non-transitory recording medium storing instructions for executing an information processing method are provided. The information processing apparatus controls installation of a first program corresponding to a first program execution environment and controls installation of a second program corresponding to a second program execution environment in response to a request from the first program.

14 Claims, 8 Drawing Sheets

(51) Int. Cl.
*G06F 8/61* (2018.01)
*G06F 8/60* (2018.01)
*G06F 8/30* (2018.01)
*G06F 21/30* (2013.01)
*G06F 9/54* (2006.01)
*G06F 9/445* (2018.01)

(52) U.S. Cl.
CPC ...... *G06F 9/44521* (2013.01); *G06F 9/44547* (2013.01); *G06F 9/546* (2013.01); *G06F 21/30* (2013.01); *G06F 21/305* (2013.01)

(58) Field of Classification Search
CPC .. G06F 9/44547; G06F 9/455; G06F 9/45558; G06F 11/327; G06F 21/305; G06F 21/30; G06F 21/10
See application file for complete search history.

(56) References Cited

U.S. PATENT DOCUMENTS

| | | | | |
|---|---|---|---|---|
| 10,318,277 | B2* | 6/2019 | Sung | G06F 8/65 |
| 10,466,991 | B1* | 11/2019 | Hussain | G06F 8/61 |
| 2005/0226641 | A1* | 10/2005 | Ando | G06F 11/327 |
| | | | | 399/8 |
| 2007/0198999 | A1 | 8/2007 | Ohhashi | |
| 2011/0065419 | A1* | 3/2011 | Book | H04W 12/12 |
| | | | | 455/411 |
| 2011/0145843 | A1 | 6/2011 | Ohhashi et al. | |
| 2011/0202915 | A1* | 8/2011 | Kuroyanagi | G06F 8/61 |
| | | | | 717/178 |
| 2011/0286044 | A1* | 11/2011 | Yuki | G06F 21/10 |
| | | | | 358/1.15 |
| 2012/0185843 | A1* | 7/2012 | Burke | G06F 8/62 |
| | | | | 717/174 |
| 2012/0266157 | A1* | 10/2012 | Mun | G06F 8/61 |
| | | | | 717/174 |
| 2012/0309464 | A1* | 12/2012 | Lim | H04M 1/72522 |
| | | | | 455/566 |
| 2013/0042232 | A1* | 2/2013 | Hirokawa | G06F 8/61 |
| | | | | 717/174 |
| 2013/0047150 | A1* | 2/2013 | Malasky | G06F 9/44547 |
| | | | | 717/176 |
| 2013/0174141 | A1* | 7/2013 | Hirokawa | G06F 8/61 |
| | | | | 717/174 |
| 2014/0040877 | A1* | 2/2014 | Goldman | G06F 8/61 |
| | | | | 717/174 |
| 2014/0082581 | A1 | 3/2014 | Ohhashi | |
| 2014/0359631 | A1 | 12/2014 | Ohhashi et al. | |
| 2014/0379134 | A1* | 12/2014 | Tsuchiya | G06F 9/45558 |
| | | | | 700/275 |
| 2015/0058242 | A1* | 2/2015 | Bucciarelli | H04W 4/16 |
| | | | | 705/325 |
| 2015/0081268 | A1 | 3/2015 | Ohhashi et al. | |
| 2015/0355918 | A1 | 12/2015 | Ohhashi | |
| 2016/0125175 | A1 | 5/2016 | Ohhashi et al. | |
| 2016/0149885 | A1* | 5/2016 | Negoro | G06F 21/30 |
| | | | | 726/6 |
| 2017/0199733 | A1* | 7/2017 | Li | H04L 41/0823 |
| 2017/0206073 | A1* | 7/2017 | Kirkpatrick | H04L 67/34 |
| 2017/0269810 | A1* | 9/2017 | Kanda | G06F 3/0488 |
| 2017/0371509 | A1* | 12/2017 | Jung | G06F 3/0482 |
| 2018/0020087 | A1* | 1/2018 | Shi | H04W 4/21 |
| 2018/0024829 | A1* | 1/2018 | Sung | G06F 8/61 |
| | | | | 717/172 |
| 2018/0060055 | A1* | 3/2018 | Kirkpatrick | G06F 9/44521 |
| 2019/0102201 | A1* | 4/2019 | Hu | G06F 9/449 |

FOREIGN PATENT DOCUMENTS

| | | |
|---|---|---|
| JP | 2016-167295 | 9/2016 |
| JP | 2017-068655 | 4/2017 |
| JP | 2017-513137 | 5/2017 |
| WO | WO2015/153490 A1 | 10/2015 |

OTHER PUBLICATIONS

Extended European Search Report dated Aug. 14, 2019 issued in corresponding European Application No. 19160578.1.

* cited by examiner

__(1)__
INFORMATION PROCESSING APPARATUS, METHOD, AND NON-TRANSITORY RECORDING MEDIUM STORING INSTRUCTIONS FOR EXECUTING AN INFORMATION PROCESSING METHOD

CROSS-REFERENCE TO RELATED APPLICATION

This patent application is based on and claims priority pursuant to 35 U.S.C. § 119(a) to Japanese Patent Application No. 2018-066203, filed on Mar. 29, 2018, in the Japan Patent Office, the entire disclosure of which is hereby incorporated by reference herein.

BACKGROUND

Technical Field

The present embodiments relate to an information processing apparatus, method, and non-transitory recording medium storing instructions for executing an information processing method.

Background Art

Among embedded devices (hereinafter, simply referred to as "devices") such as image forming apparatuses and portable terminals, there are devices that permits additional installation of applications according to the intended use of the user after shipment (hereinafter referred to as "additional application") in addition to applications installed at factory before shipment.

The additional application needs to be created in a format required by a program execution environment (for example, operating system (OS), etc., hereinafter referred to as "platform") in the device to which the additional application is installed. For example, the additional application is required to be provided with a method and a file configuration for enabling an installation platform to manage lifecycle (installation, startup, stop, uninstallation, etc.) of the additional application.

SUMMARY

Embodiments of the present disclosure described herein provide an information processing apparatus, method, and non-transitory recording medium storing instructions for executing an information processing method. The information processing apparatus controls installation of a first program corresponding to a first program execution environment and controls installation of a second program corresponding to a second program execution environment in response to a request from the first program.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
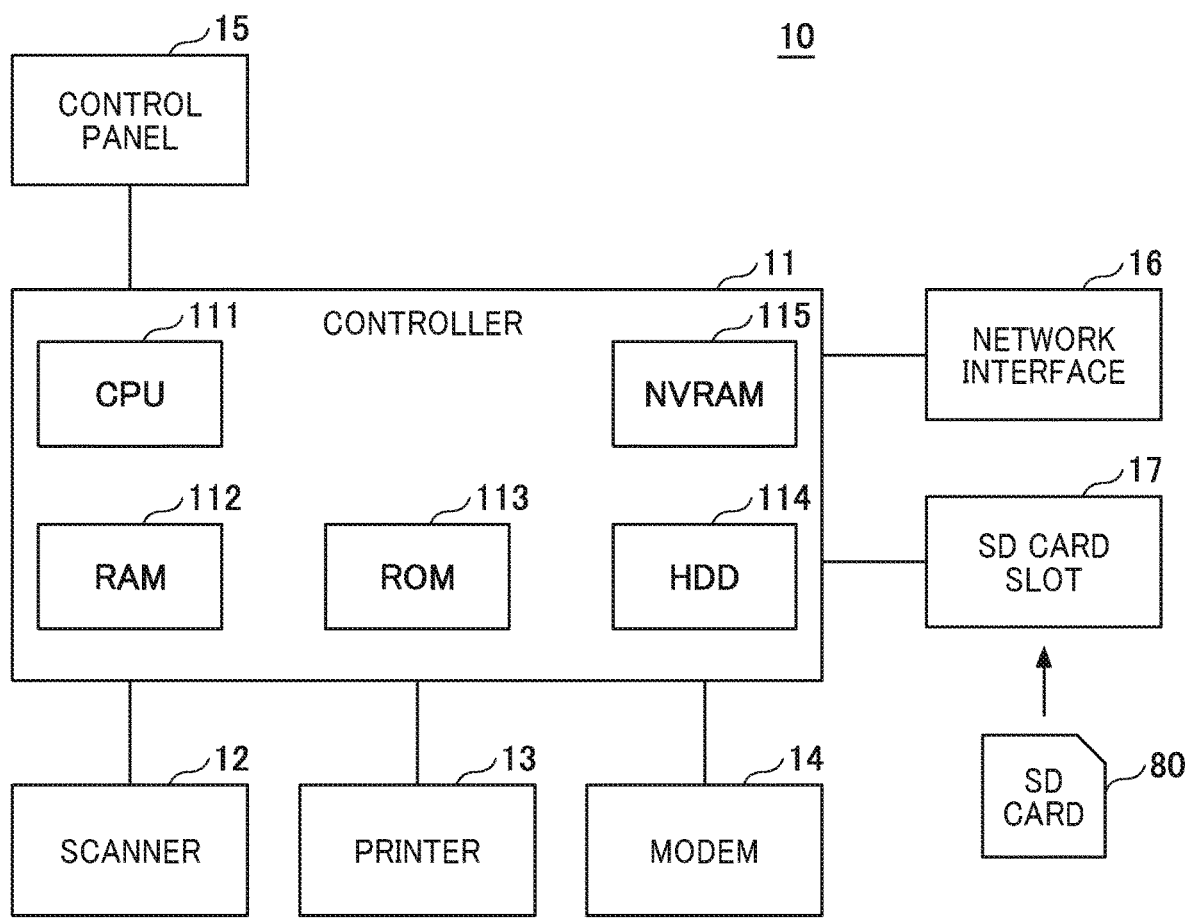
FIG. 1 is a diagram illustrating a hardware configuration of an image forming apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Hereinafter, a description is given of embodiments of the present disclosure with reference to the drawings. FIG. 1 is a diagram illustrating a hardware configuration of an image forming apparatus 10 according to the embodiments of the present disclosure. As illustrated in FIG. 1, the image forming apparatus 10 includes hardware such as a controller 11, a scanner 12, a printer 13, a modem 14, a control panel 15, a network interface (I/F) 16, and a secure digital (SD) card slot 17.

The controller 11 includes a central processing unit (CPU) 111, a random access memory (RAM) 112, a read only memory (ROM) 113, a hard disc drive (HDD) 114, and a non-volatile random access memory (NVRAM) 115. The ROM 113 stores various programs and data used by the programs. The RAM 112 is used as a memory area to which a program is loaded or used as a work area for executing a loaded program. The CPU 111 executes a program loaded to the RAM 112 to implement various functions. The HDD 114 stores programs and various kinds of data used by the programs. The NVRAM 115 stores various kinds of setting information.

The scanner 12 is hardware (image reading device) that scans a document to obtain image data. The printer 13 is hardware (printing device) that forms an image on a printing sheet in accordance with print data. The modem 14 is hardware for connecting to a telephone line, which is used for transmitting and receiving image data by facsimile communication. The control panel 15 is hardware that includes an input device such as keys or buttons that accepts a user input and a display device such as a liquid crystal panel. The liquid crystal panel may have a touch panel function. In this case, the liquid crystal panel also implements a function of input device. The network interface 16 is hardware to connect the image forming apparatus 10 to a wired or wireless network, such as a local area network (LAN). The SD card slot 17 is used for reading programs stored in a SD card 80. Accordingly, in the image forming apparatus 10, not only the programs stored in the ROM 113 but also the programs stored in the SD card 80 may be loaded to the RAM 112 for execution. In addition, or in alternative to the SD card 80, any other suitable storage medium may be used, such as a compact disk read only memory (CD-ROM) or a universal serial bus (USB) memory. In other words, the type of storage medium corresponding to the SD card 80 is not limited to the predetermined one. In this case, any other suitable hardware is used in alternative to the SD card slot 17 depending on a type of storage medium.

Figure 2:
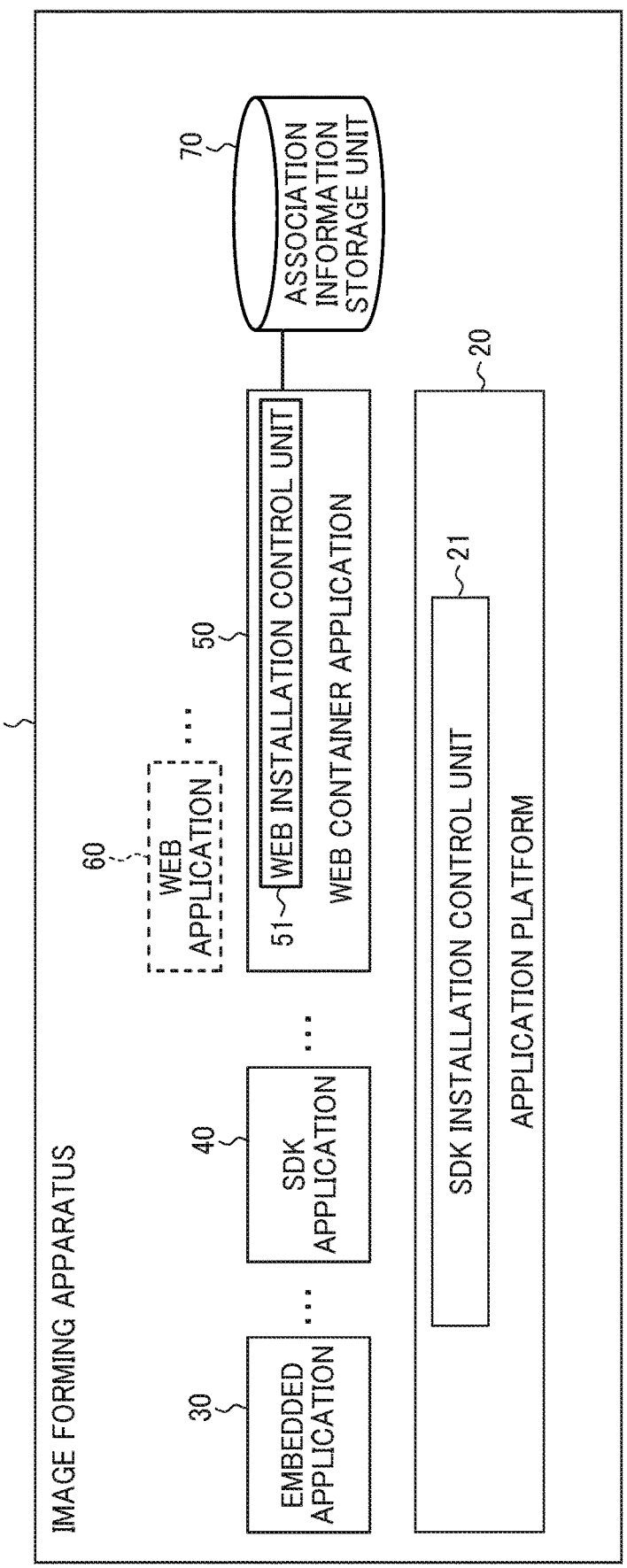
FIG. 2 is a diagram illustrating a functional configuration of the image forming apparatus according to the embodiments of the present disclosure.

FIG. 2 is a diagram illustrating a functional configuration of the image forming apparatus 10 according to the embodiments of the present disclosure. In FIG. 2, the image forming apparatus 10 includes an application platform 20, one or more embedded applications 30, one or more SDK applications 40, a web container application 50, and the like. Each of these functional units is implemented by processes executed by the CPU 111 according to one or more programs installed on the image forming apparatus 10. The image forming apparatus 10 also uses an association information storage unit 70. The association information storage unit 70 can be implemented, for example, by using the HDD 114 or a storage device or the like connectable to the image forming apparatus 10 through a network.

The application platform 20 manages the embedded application 30 and an SDK application 40 and also functions as a platform of the embedded application 30 and the SDK application 40. The platform refers to software managing an application program (hereinafter referred to as "application") and functioning as an execution environment of the application in the present embodiment. The management of the application is, for example, installation, startup, stop, uninstall, and the like of the application. The execution environment of the application means an application programming interface (API) for controlling the application and software including an implementation of the API. Note that an OS such as Android (registered trademark) or the like may be used as the application platform 20.

In FIG. 2, the application platform 20 includes an SDK installation control unit 21. The SDK installation control unit 21 controls installation and uninstallation of the SDK application 40 on the application platform 20.

The embedded application 30 is an application installed in a factory before shipment of the image forming apparatus 10. The SDK application 40 is an application that is additionally installed in accordance with the purpose of use by the user after shipment of the image forming apparatus 10. For example, the SDK application 40 may be developed using SDK for development of the SDK application 40.

The SDK application 40 is developed in a format required by the application platform 20. For example, the SDK application 40 is required to be provided with a method and a file configuration for enabling an installation platform to manage lifecycle (installation, startup, stop, uninstallation, etc.) of the SDK application 40.

The web container application 50 is an application program functioning as a general web container, for example, Tomcat (registered trademark) or the like. That is, the web container application 50 functions as a platform for a web application 60 such as a servlet. The web container application 50 opens the Hypertext Transfer Protocol (Secure) (HTTP (S)) port, notifies the web application 60 corresponding to the HTTP request uniform resource locator (URL) of the content of the HTTP request.

As illustrated in FIG. 2, the web container application 50 includes a web installation control unit 51. The web installation control unit 51 controls installation and uninstallation of the web application 60. The function of the web installation control unit 51 (installation and uninstallation control of the web application 60, etc.) can be invoked from outside through an API.

The web container application 50 may be developed as an embedded application 30 or may be developed as an SDK application 40. That is, in the present embodiment, the web container application 50 is one of the applications managed by the application platform 20. However, the web container application 50 may be an application that is not managed by the application platform 20.

The web application 60 is a web application such as a servlet. The web application 60 executes processing according to the content of the request notified from the web container. Note that the web application 60 has no direct relationship with the application platform 20. That is, the web application 60 is not under control of the application platform 20. This is because the web application 60 does not have a format required by the application platform 20.

In FIG. 2, a rectangle indicating the web application 60 is indicated by a broken line. The broken line indicates a state in which the web application 60 is not installed in the image forming apparatus 10.

As described above, the image forming apparatus 10 of the present embodiment has two platforms, the application platform 20 and the web container application 50. In this state, when the user wishes to install the web application 60, the user needs to install the web application 60 in a manner different from that of the SDK application 40 (that is, in accordance with the web container application 50). In order to solve such a complication, in the present embodiment, the web application 60 is associated with the SDK application 40. In the present embodiment, such association is referred to as a parent-child relationship between the web application 60 and the SDK application 40.

Figure 3:
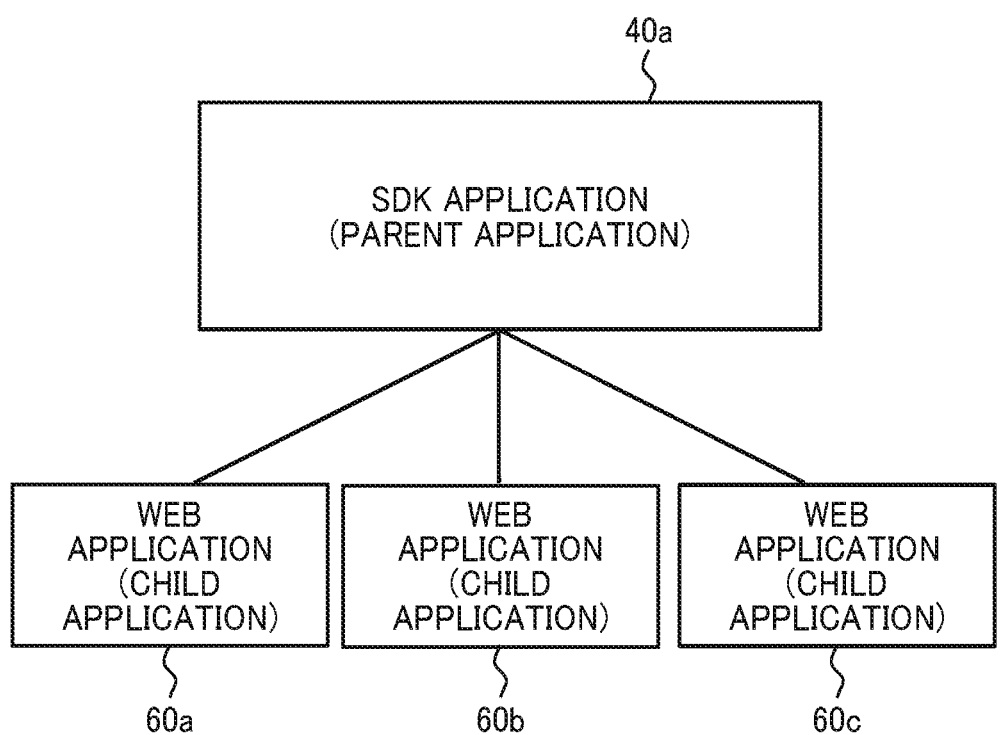
FIG. 3 is a diagram illustrating a parent-child relationship between a web application and a software development kit (SDK) application.

FIG. 3 is a diagram illustrating the parent-child relationship between the web application 60 and the SDK application 40. As illustrated in FIG. 3, in the parent-child relationship between the web application 60 and the SDK application 40, the SDK application 40 is a parent (parent application) and the web application 60 is a child (child application). In FIG. 3, an example is illustrated in which the SDK application 40*a* is a parent application of three web applications 60, 60*a*, 60*b*, and 60*c*.

The SDK application 40*a* as the parent application does not need to have a function unique to the SDK application 40*a* as long as the SDK application 40*a* has a function of installing the web application 60 as a child application with the installation of the SDK application 40*a* and uninstalling the web application 60 as a child application when the SDK application 40*a* is uninstalled. As a result, the user can install or uninstall the web application 60 associated with the parent application by installing or uninstalling the parent application in accordance with the method according to the SDK application 40 (that is, in accordance with the application platform 20).

Although FIG. 3 illustrates an example in which three web applications 60 are associated as child applications of the SDK application 40a, relationship between the parent application and the child application may be one to one or one to many.

In the association information storage unit 70 in FIG. 2, information indicating a parent-child relationship with respect to the web application 60 installed in the web container application 50 is stored.

Figure 4:
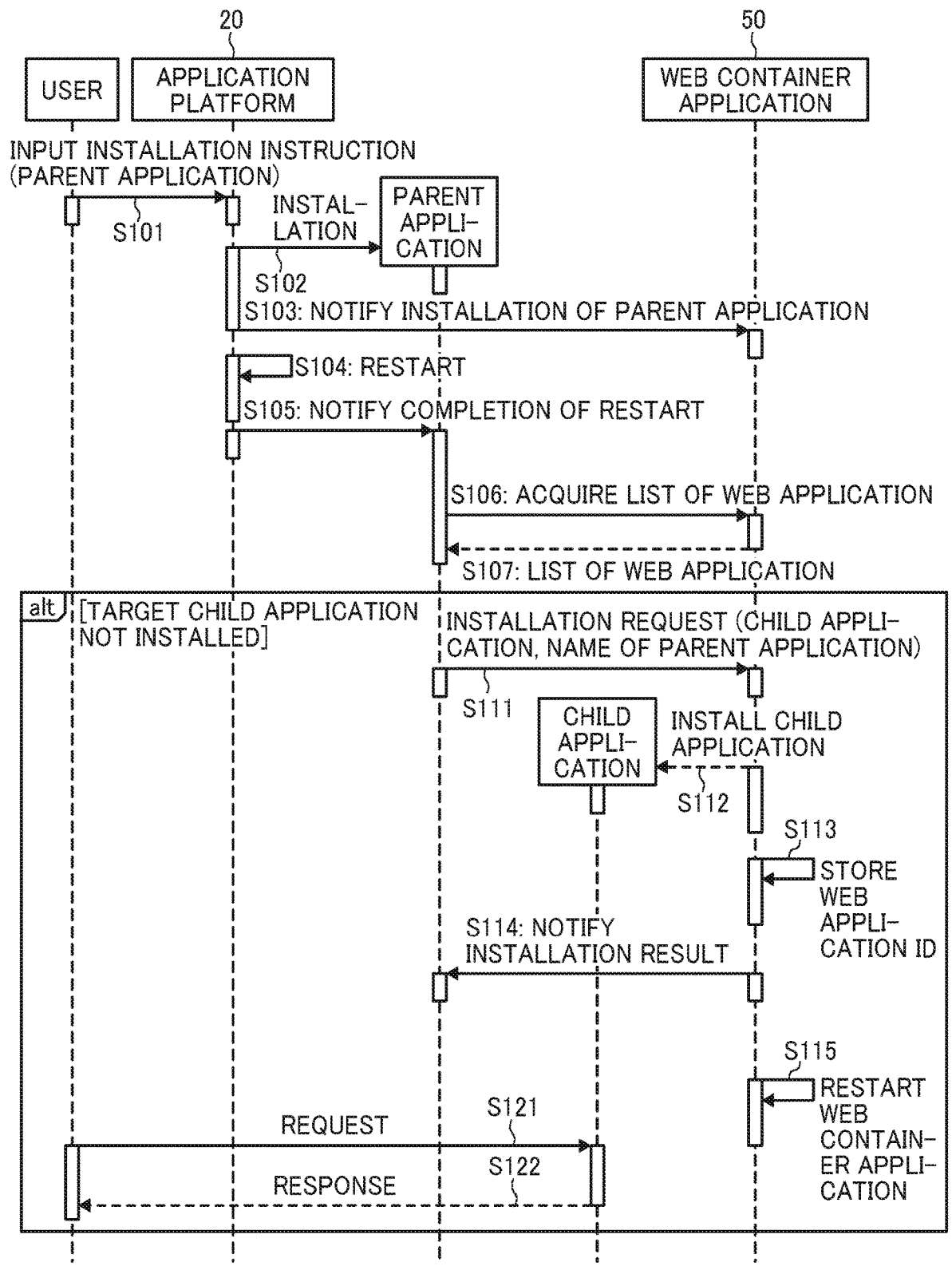
FIG. 4 is a sequence diagram illustrating an installation process of the web application.

Hereinafter, a description is given of processes performed by the image forming apparatus 10. FIG. 4 is a sequence diagram illustrating an installation process of the web application 60.

In step S101, the user selects an SDK application 40a (parent application) corresponding to a web application 60 to be installed, through the control panel 15 of the image forming apparatus 10 and inputs an installation instruction. The installation package (archive file) of the parent application may be stored in an external recording medium such as the SD card 80 inserted in the image forming apparatus 10 or may be stored in a computer connected to the image forming apparatus 10 through a network.

In response to the instruction, the SDK installation control unit 21 of the application platform 20 acquires the installation package of the selected parent application and installs the parent application using the installation package in step S102. As a result, a file group included in the installation package of the parent application is developed in a file system formed in the HDD 114, for example, in a folder configuration required by the application platform 20. However, among the file groups, an installation package (archive file) of the web application 60 which is a child application of the parent application is included.

Subsequently, the SDK installation control unit 21 notifies each application on the application platform 20 of the installation of a new application (corresponding parent application). The notification is also sent to the web container application 50 in step S103. Note that the notification in step S103 may not be executed by the application platform 20 (that is, depending on the OS or the like).

In step S104, the SDK installation control unit 21 restarts the image forming apparatus 10. The restart of the image forming apparatus 10 may be automatically performed by the SDK installation control unit 21. Alternatively, the SDK installation control unit 21 may display a message prompting the restart on the control panel 15, and the image forming apparatus 10 may be restarted in response to an operation by the user.

Upon completion of restart, the application platform 20 notifies the completion of restart of the image forming apparatus 10 to an application that sets an event handler for an event of activation of the image forming apparatus 10, among the applications on the application platform 20. Therefore, by setting the event handler according to the installation, the parent application is also notified of completion of restart of the image forming apparatus 10 in step S105.

The parent application starts the installation of the child application with the notification of completion of restart of the image forming apparatus 10 as a trigger. However, when the parent application is automatically started by the application platform 20 at the time of starting the image forming apparatus 10, the start time of the first parent application after the installation may be used as a trigger for the processing. Or, if the completion of the installation is notified to the parent application from the SDK installation control unit 21 after the restart of the image forming apparatus 10, the notification may be used as a trigger for the processing. Alternatively, a button or the like for accepting the installation instruction by the parent application may be displayed on the control panel 15, and an operation on the button or the like may be used as a trigger for the processing.

In steps S106 and S107, the parent application acquires attribute information (web application identification information (hereinafter referred to as "web application ID")) and a list of information including version information and the like of the web application 60 installed on the web container application 50 from the web container application 50 and determines the presence or absence of a child application not installed among the child applications of the parent application. That is, the presence or absence of a child application related to the web application ID not included in the list of information among child applications of the parent application is determined. When there is no corresponding child application, processing after step S111 is not executed.

On the other hand, when there is at least one corresponding child application (hereinafter referred to as "target child application"), steps S111 to S114 are executed for each target child application.

In step S111, the parent application inputs the installation request including the installation package of the target child application stored in one of the installation destinations of the parent application, and a parent application package name which is identification information of the parent application, to the web installation control unit 51 of the web container application 50.

In response to the installation request, the web installation control unit 51 installs (deploys) the target child application to the web container application 50 using the installation package of the target child application in step S112. In step S113, the web installation control unit 51 stores the web application ID of the target child application in the association information storage unit 70 in association with the parent application package name included in the installation request. In step S114, the web installation control unit 51 notifies the installation result to the parent application. The installation result is information indicating success or failure of the installation.

When steps S111 to S114 are executed for all target child applications, the web installation control unit 51 activates the installation of each child application by restarting the web container application 50 in step S115.

Thereafter, for the child application installed, for example, in response to a request input by the user in step S121, a response can be returned in step S122. Actually, the request is input to the child application through the web container application 50, and the response is returned through the web container application 50.

Figure 5:
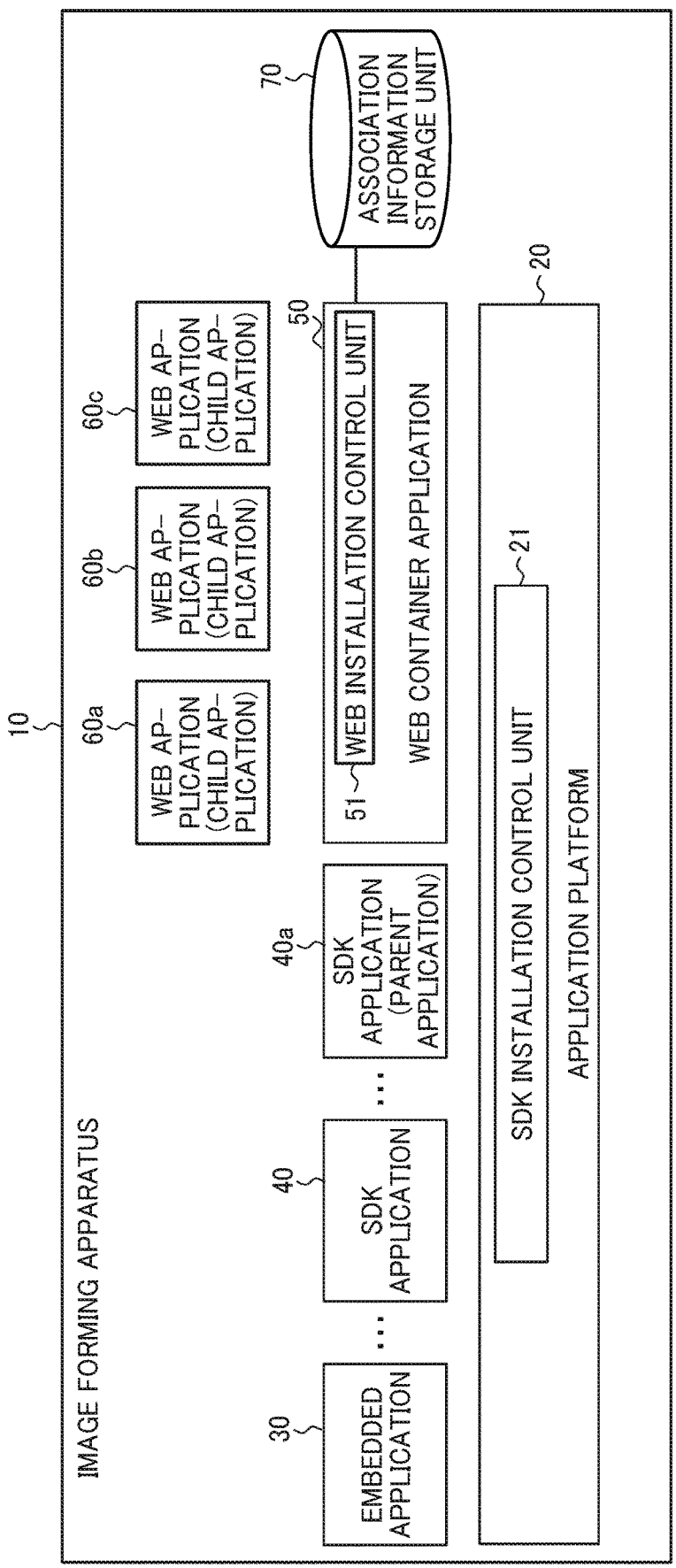
FIG. 5 is a diagram illustrating a functional configuration of the image forming apparatus after installation of the web application.

The functional configuration of the image forming apparatus 10 illustrated in FIG. 2 changes, for example, as illustrated in FIG. 5 by executing the processing as illustrated in FIG. 4.

FIG. 5 is a diagram illustrating a functional configuration of the image forming apparatus 10 after installation of the web application 60. In FIG. 5, an SDK application 40a as a parent application is installed on the application platform 20, and web applications 60a, 60b and 60c which are child applications of the SDK application 40a are installed on the web container application 50.

In the case where the relationship between the parent application and the child application is not 1:1 but 1:N (N>1), the parent application may include (N−1) other parent applications (hereinafter referred to as "sibling application"), so that N parent applications and N child applications may be installed as a result. In this case, the names of the N parent applications may be the names corresponding to the functions of the N respective web applications 60. By doing so, for example, when display of a list of installed applications is requested to the application platform 20, the N parent applications are displayed. As a result, it is possible to indicate the existence of the N web applications 60 by the presence of the N parent applications to the user.

According to the processing illustrated in FIG. 4, since the installation of the child application is controlled by the parent application, installation process can be flexibly changed according to the parent application. For example, when a parent application wishes to change the child application to be installed according to model, the parent application may refer to the model information of the image forming apparatus 10 to the application platform 20, for example, following step S105. The parent application may change the child application to be installed according to the reference result. Also, even if the web application 60 having the same web application ID with the child application has already been installed after referring to the list information of the web application 60 acquired in step S107, the parent application may install the child application if the version of the child application is newer than that of the existing web application 60.

On the other hand, instead of the parent application, the web container application 50 may install the child application associated with the parent application to be installed, in response to the installation notification in step S103. In this case, it is not necessary to implement the installation process in each parent application, but the installation process cannot be changed flexibly according to the parent application.

Figure 6:
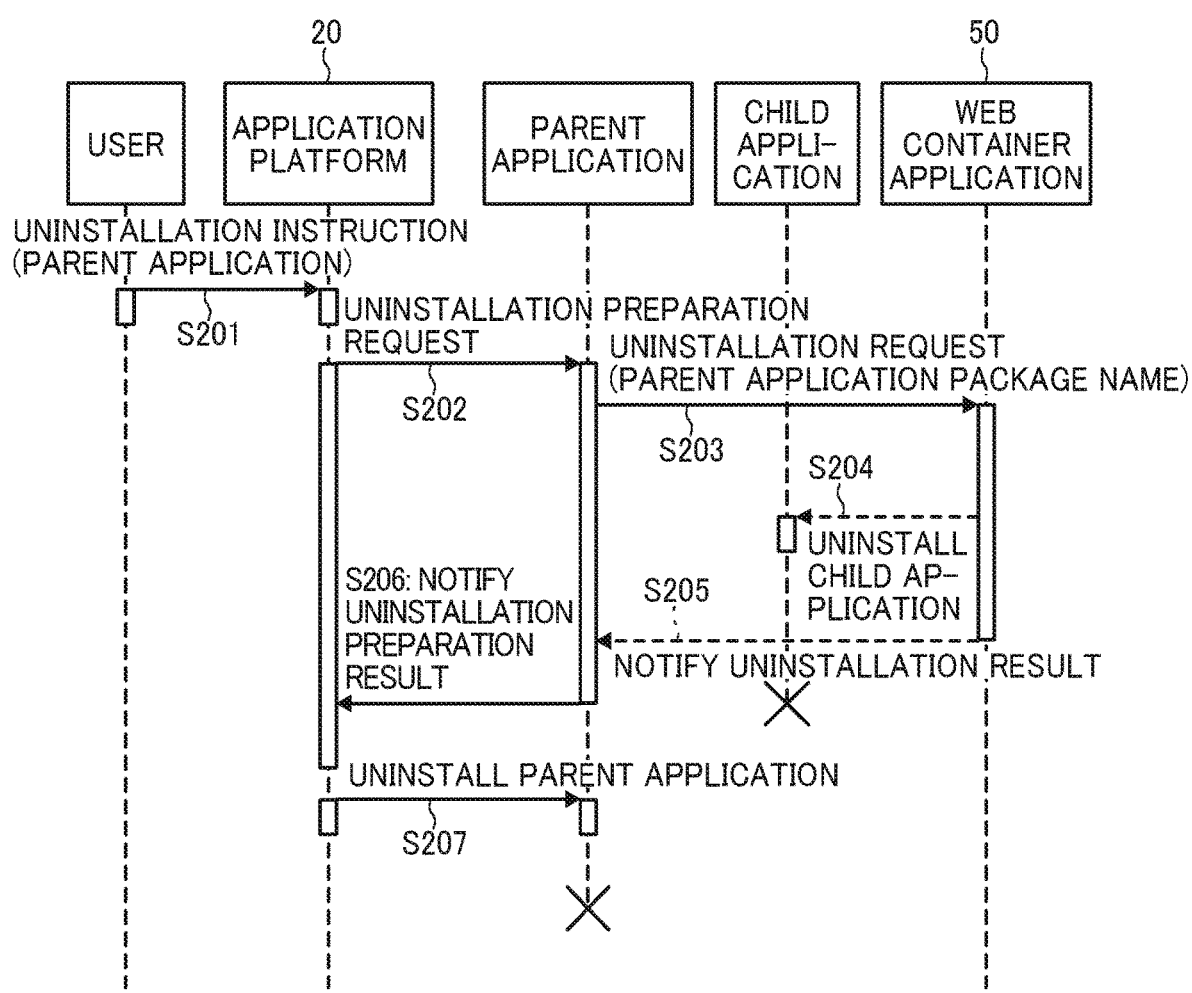
FIG. 6 is a sequence diagram illustrating a first example of an uninstallation process of the web application.

Next, uninstallation of the web application 60 is described. FIG. 6 is a sequence diagram illustrating a first example of an uninstallation process of the web application 60.

For example, when the SDK application 40 which is the parent application of one of the web applications 60, is selected as an uninstall target from a group of SDK applications 40 displayed on the application list screen displayed on the control panel 15 by the SDK installation control unit 21 of the application platform 20, and an uninstallation instruction is input by the user in step S201, the SDK installation control unit 21 transmits a preparation request for uninstallation to the parent application in step S202. In response to the preparation request, the parent application releases the resource or the like secured the parent application.

In step S203, the parent application transmits an uninstallation request including the parent application package name of the parent application to the web installation control unit 51 of the web container application 50. In response to the uninstallation request, the web installation control unit 51 acquires the web application ID stored in the association information storage unit 70 associated with the parent application package name included in the uninstallation request and uninstalls (undeploys) the child application associated with the web application ID in step S204. At this time, the web installation control unit 51 deletes the web application ID and the parent application package name associated with the web application ID from the association information storage unit 70.

In step S205, the web installation control unit 51 notifies the parent application of the uninstallation result of the child application. The uninstallation result is information indicating success or failure of uninstallation of the child application. In step S206, the parent application notifies the SDK installation control unit 21 of the preparation result of uninstallation. The preparation result is information indicating whether uninstallation is possible or not. For example, "uninstallation is possible" may be notified when the uninstallation of the child application is successful, and "uninstallation is impossible" may be notified if uninstallation of the child application fails.

In a case where the response from the parent application indicates that uninstallation is possible, the SDK installation control unit 21 uninstalls the parent application in step S207. As a result, a plurality of files constituting the parent application are deleted from the HDD 114.

Figure 7:
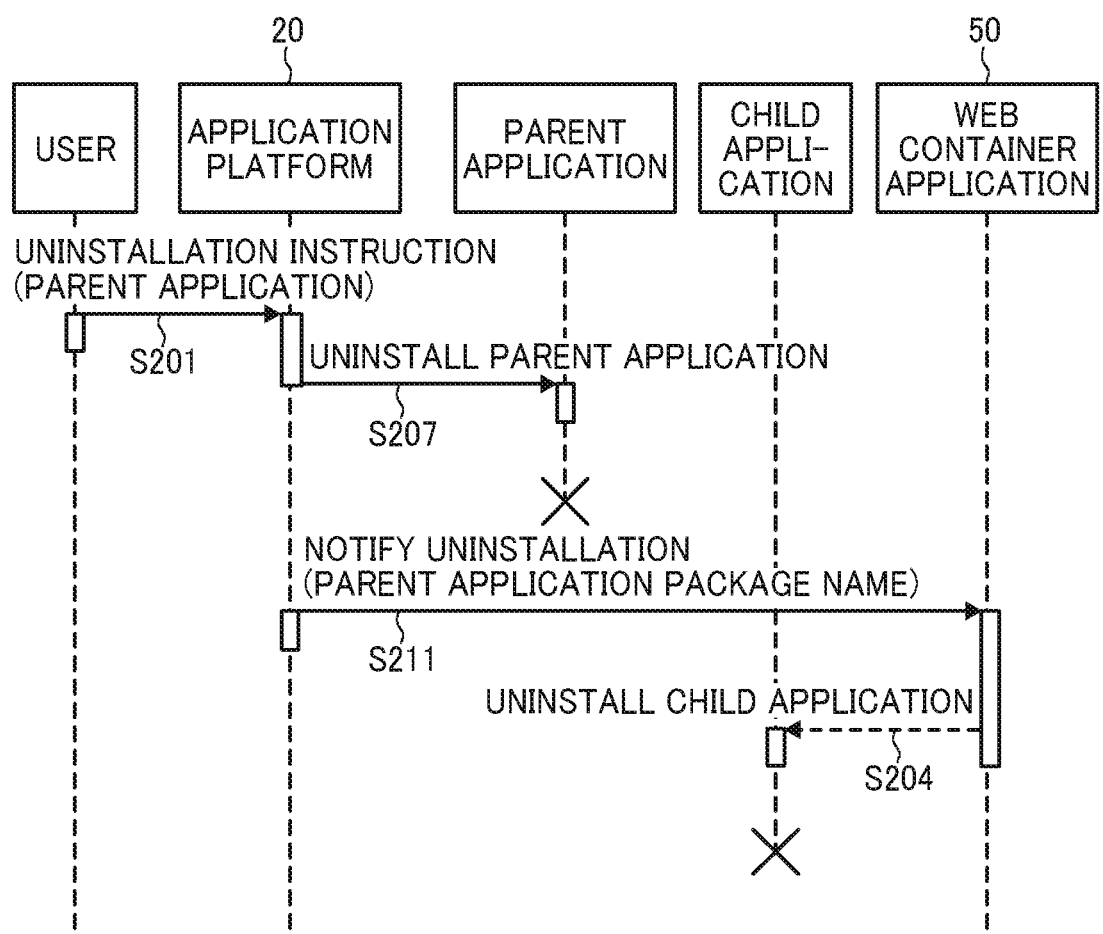
FIG. 7 is a sequence diagram illustrating a second example of the uninstallation process of the web application.

Alternatively, the uninstallation of the web application 60 may be executed as illustrated in FIG. 7. FIG. 7 is a sequence diagram illustrating a second example of the uninstallation process of the web application 60. In FIG. 7, the same steps as those in FIG. 6 are denoted by the same step numbers, and the description thereof is omitted.

In response to an uninstall instruction from the user in step S201, the SDK installation control unit 21 uninstalls the parent application in step S207.

Subsequently, the SDK installation control unit 21 notifies each application on the application platform 20 that the SDK application 40 has been uninstalled. The notification includes the package name (in this case, parent application package name) of the uninstalled SDK application. Since the web container application 50 is also an application on the application platform 20, the uninstallation is notified in step S211.

If there is a web application ID stored in the association information storage unit 70 corresponding to the package name included in the notification, the web installation control unit 51 of the web container application 50 uninstalls (undeploys) the application 60 corresponding to the web application ID in step S204.

When the SDK application 40a in FIG. 5 is uninstalled, the functional configuration of the image forming apparatus 10 returns to the state illustrated in FIG. 2.

The implementation of each parent application is highly likely to be similar. Therefore, the provider or the like of the application platform 20 may release the source code as a model of the parent application to reduce burden of third-party vendor or the like for developing the parent application.

Figure 8:
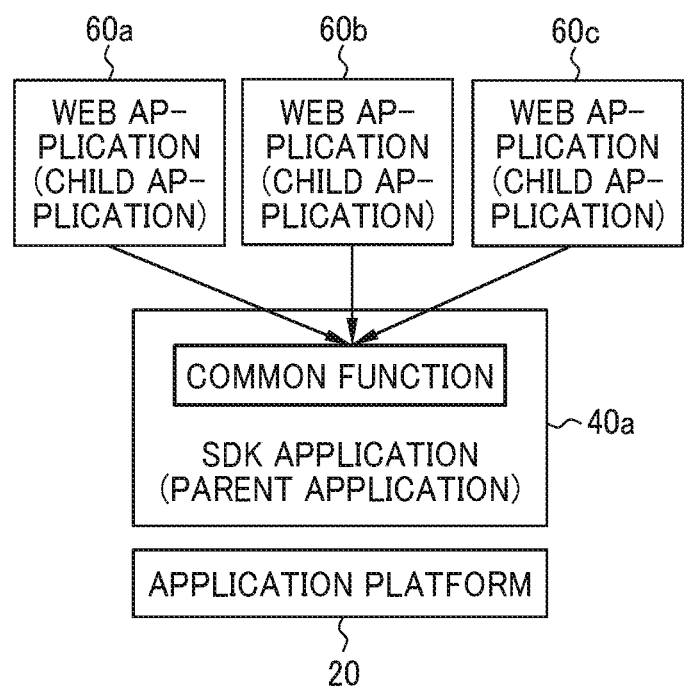
FIG. 8 is a diagram illustrating an example of a parent application in which common functions of a plurality of child applications are implemented.

Further, in a parent application associated with a plurality of child applications, a function common to the plurality of child applications or a function duplicated among the child applications (hereinafter referred to as "common function") may be implemented in the parent application. FIG. 8 is a diagram illustrating an example of the parent application in which a common function of a plurality of child applications is implemented. Each child application may invoke the common function, for example, by inter-application communication or the like. By installing the common function in the parent application, overlapping source codes can be reduced and the amount of memory used can be reduced.

Also, regardless of the number of child applications, the parent application may function as a relay point to the API of the application platform 20. In other words, the child application may indirectly call the API of the application platform 20 through inter-application communication with the parent application or the like. More specifically, processing is requested from the child application to the parent application, and after the parent application executes processing corresponding to the request within the range of authority of the parent application using the application platform 20, the result of the processing may be returned to the child application. In doing so, the child application can use the function of the application platform 20 within the range of the authority permitted for the parent application. For example, in the case of Android (registered trademark), when accessing a file system or a resource of a specific device, a permission declaration concerning the device is required in a Manifest file of the application. Since the web application 60 is a program operating on the web container application 50, such an authority cannot be granted freely. Therefore, by giving necessary authority to the parent application, it is possible to cause the web application 60 to execute processing under the scope of the authority.

Also, when the parent application provides a function through the screen displayed on the control panel 15, the child application may accept settings related to the parent application through the network.

As described above, in the case where a plurality of program execution environments such as the application platform 20 and the web container application 50 coexists, installation and uninstallation of the web application 60 can be implemented by installing and uninstalling the SDK application 40 according to the present embodiment. That is, it is possible to simplify the management of the program when a plurality of program execution environments coexists. Therefore, it is possible for the user to reduce the necessity of learning the installation method of the web application 60 separately from the installation method of the SDK application 40.

Note that this embodiment may be applied in the case where three or more program execution environments coexist. For example, a program installed for the first program execution environment may install and uninstall a program corresponding to the second program execution environment and a program corresponding to the third program execution environment.

In the above description, the example where the image forming apparatus 10 is an example of the information processing apparatus has been described. However, when the control panel 15 of the image forming apparatus 10 is implemented by an information processing apparatus such as a smartphone or a tablet terminal, this embodiment may be applied to the information processing apparatus. Alternatively, the present embodiment may be applied to another information processing apparatus such as a projector, an electronic whiteboard or a video conference system.

In the present embodiment, the image forming apparatus 10 is an example of an information processing apparatus. The application platform 20 is an example of a first program execution environment. The web container application 50 is an example of a second program execution environment.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
a memory that stores a plurality of instructions; and
a processor, when executing the plurality of instructions, configures the processor to:
control installation within the information processing apparatus of a first program corresponding to a first program execution environment, and
control, subsequent to installation of the first program, installation within the information processing apparatus of a second program different from the first program and corresponding to a second program execution environment using an installation package associated with the second program such that the first program and the second program are installed in a parent-child relationship, respectively, in response to a request from the first program to the second program execution environment, the request from the first program including an indication of the installation package associated with the second program such that the processor determines the installation package used to install the second program using the indication thereof included in the request from the first program.

2. The information processing apparatus of claim 1, wherein when the first program is uninstalled, the processor uninstalls the second program installed in response to the request from the first program.

3. The information processing apparatus of claim 1, wherein the processor controls installation of the second program in response to the request for installation of the second program requested by the first program as the first program is installed.

4. The information processing apparatus of claim 1, wherein the processor is configured to store an association between an identification of the second program and the identification of the first program.

5. The information processing apparatus of claim 4, wherein the processor is configured to automatically uninstall the second program when uninstalling the first program based on the association between the second program and the first program.

6. The information processing apparatus of claim 1, wherein
the second program execution environment is a web container, and
the second program is a web application configured to control deployment of the web application to the web container in response to the request from the first program.

7. An information processing method performed by an information processing apparatus comprising:
controlling installation within the information processing apparatus of a first program corresponding to a first program execution environment; and
controlling, subsequent to installation of the first program, installation within the information processing apparatus of a second program different from the first program and corresponding to a second program execution environment using an installation package associated with the second program such that the first program and the second program are installed in a parent-child relationship, respectively, in response to a request from the first program to the second program execution environment, the request from the first program including an indication of the installation package associated with the second program such that the installation package used to install the second program is determined using the indication thereof included in the request from the first program.

8. The information processing method of claim 7, further comprising:
storing an association between an identification of the second program and the identification of the first program.

9. The information processing method of claim 8, further comprising:
automatically uninstalling the second program when uninstalling the first program based on the association between the second program and the first program.

10. The information processing method of claim 7, wherein
the second program execution environment is a web container, and
the second program is a web application configured to control deployment of the web application to the web container in response to the request from the first program.

11. A non-transitory recording medium storing instructions which, when executed by one or more processors of an information processing apparatus, configure the information processing apparatus to,
control installation within the information processing apparatus of a first program corresponding to a first program execution environment, and
control, subsequent to installation of the first program, installation within the information processing apparatus of a second program different from the first program and corresponding to a second program execution environment using an installation package associated with the second program such that the first program and the second program are installed in a parent-child relationship, respectively, in response to a request from the first program to the second program execution environment, the request from the first program including an indication of the installation package associated with the second program such that the one or more processors determine the installation package used to install the second program using the indication thereof included in the request from the first program.

12. The non-transitory recording medium of claim 11, wherein the instructions, when executed by the one or more processors, configure the information processing apparatus to store an association between an identification of the second program and the identification of the first program.

13. The non-transitory recording medium of claim 12, wherein the instructions, when executed by the one or more processors, configure the information processing apparatus to automatically uninstall the second program when uninstalling the first program based on the association between the second program and the first program.

14. The non-transitory recording medium of claim 11, wherein
the second program execution environment is a web container, and
the second program is a web application configured to control deployment of the web application to the web container in response to the request from the first program.

* * * * *